(12) United States Patent
Wakayama

(10) Patent No.: US 7,174,802 B2
(45) Date of Patent: Feb. 13, 2007

(54) AUTOMATIC TRANSMISSION SHIFTER ASSEMBLY FOR AUTOMOTIVE VEHICLES

(75) Inventor: Hiroyuki Wakayama, Hiroshima (JP)

(73) Assignee: Delta Kogyo Co., Ltd. (JP)

( * ) Notice: Subject to any disclaimer, the term of this patent is extended or adjusted under 35 U.S.C. 154(b) by 440 days.

(21) Appl. No.: 10/610,733

(22) Filed: Jun. 30, 2003

(65) Prior Publication Data

US 2004/0045392 A1   Mar. 11, 2004

(30) Foreign Application Priority Data

Jul. 3, 2002 (JP) .............................. 2002-194639

(51) Int. Cl.
*B60K 20/00* (2006.01)
(52) U.S. Cl. ................ 74/473.35; 74/473.18
(58) Field of Classification Search ............ 74/473.33, 74/473.1, 471 R, 473.18, 473.21, 473.34, 74/473.35, 473.36, 490, 543, 548, 566, 612
See application file for complete search history.

(56) References Cited

U.S. PATENT DOCUMENTS

| | | | | |
|---|---|---|---|---|
| 1,927,646 A | * | 9/1933 | Miller ...................... 74/473.33 |
| 3,800,909 A | * | 4/1974 | Duncanson et al. ........ 181/207 |
| 4,216,680 A | * | 8/1980 | Hayashi et al. ........... 74/473.33 |
| 4,344,334 A | * | 8/1982 | Schmittbetz et al. ..... 74/473.21 |
| 4,432,251 A | * | 2/1984 | Malott ....................... 74/337.5 |
| 4,492,130 A | * | 1/1985 | Lamy et al. .............. 74/473.29 |
| 4,768,393 A | * | 9/1988 | Beaman .................... 74/473.29 |
| 5,509,322 A | * | 4/1996 | Anderson et al. ............. 74/335 |
| 5,862,708 A | * | 1/1999 | Shamoto ................... 74/473.18 |
| 5,941,123 A | * | 8/1999 | Numakami ................. 74/18.1 |
| 6,481,950 B1 | * | 11/2002 | Stickney et al. ............ 414/694 |

\* cited by examiner

*Primary Examiner*—Richard Ridley
*Assistant Examiner*—Terence Boes
(74) *Attorney, Agent, or Firm*—Gerald E. Hespos; Anthony J. Casella

(57) ABSTRACT

An automatic transmission shifter assembly for automotive vehicles includes a shift lever, a gate plate formed with a gate passage, and a slide block having an engagement recess to be engaged with the shift lever, wherein the slide block is adapted to be moved frontwardly and rearwardly in response to the manipulation of the shift lever. The shifter assembly is provided with a noise-reducing member made of a flexible material, and attached onto the shift lever to extend from a region allowing the noise-reduction member to be brought into contact with the gate passage to a region allowing the noise-reduction member to be engaged with the engagement recess. The shifter assembly can effectively suppress hitting noises.

18 Claims, 6 Drawing Sheets

LEFT ← → RIGHT

LEFT ←——→ RIGHT

AUTOMATIC TRANSMISSION SHIFTER ASSEMBLY FOR AUTOMOTIVE VEHICLES

FIELD OF THE INVENTION

The present invention relates to an automatic transmission shifter assembly for automotive vehicles, having a shift lever adapted to be manipulated along a guide passage formed in a gate plate.

BACKGROUND OF THE INVENTION

There has heretofore been known a gate-type shifter assembly 100 for an automatic transmission of an automotive vehicle, as shown in FIG. 5A. The gate-type shifter assembly 100 has a gate passage including an automatic-mode gate passage segment 101 for shifting the transmission in an automatic mode and a manual-mode gate passage segment 102 for shifting the transmission in a manual mode. The automatic-mode gate passage segment 101 includes a park position P, a reverse position R, a neutral position N and a drive position D to define a curved shift pattern between the respective positions, and the manual-mode gate passage segment 102 includes a shift-up position (+) and a shift-down position (−) which are disposed on the side of the drive position D. These gate passage segments 101, 102 are configured to guide a shaft 103a of a shift lever 103.

As shown in FIG. 6 wherein the front side of the drawing sheet corresponds to the front side of the vehicle, a shift mechanism of the shifter assembly includes the shift lever supported swingably about its lower end 103b in the frontward/rearward or longitudinal direction and the rightward/leftward or lateral direction of the vehicle, a sliding block 104 adapted to be engaged with the shift lever 103 and moved in the longitudinal direction when the shift lever 103 is manipulated along the automatic-mode gate passage segment 101, as shown in FIGS. 5B and 6, so as to move a shift block (not shown) coupled with the sliding block 104 and a cable (not shown) connected between the shift block and the transmission to shift the transmission in the automatic mode, and a support member 115 swingably supporting the lower end 103b of the shift lever 103.

The sliding block 104 is formed as a fork-shaped body having an engagement recess 104a. When the shift lever 103 is manipulated along the automatic-mode gate passage segment 101, the shaft 103a of the shift lever 103 is received in and engaged with the engagement recess 104a so that the transmission is shifted in the automatic mode, as described above. On the other hand, when the shift lever 103 is inclined in the lateral direction, and moved from the drive position D of the automatic-mode gate passage segment 101 into the manual-mode gate passage segment 102 (see FIG. 5B), the shaft 103a is disengaged from the engagement recess 104 as shown in the arrow a to preclude the sliding block 104 from being moved and immobilize the cable (not shown), so that the transmission is shifted in the manual mode.

In the conventional shifter assembly, when the shift lever 103 is slidably moved along the gate passage 101, 102, the shaft 103a of the shift lever 103 hits against the corners and the ends of the gate passage to generate undesirable hitting sounds or noises. In addition, additional hitting noise is generated between the shaft 103a and the sliding block 104 when the shift lever 103 is returned from the manual-mode gate passage segment 102 to the drive position D of the automatic-mode gate passage segment 101.

SUMMARY OF THE INVENTION

It is an object of the present invention to provide an automatic transmission shifter assembly for automotive vehicles which is free from the problems residing in the conventional shifter assembly.

It is another object of the present invention to provide an automatic transmission shifter assembly for automotive vehicles which can suppress generation of noises.

According to an aspect of the present invention, a shifter assembly for an automatic transmission of an automotive vehicle is provided with a shift lever, a gate plate formed with a gate passage for guiding movement of the shift lever, and a noise-reducing member being attached on the part of the shift lever that corresponds to the gate passage.

Other features and advantages of the present invention will be apparent from the accompanying drawings and from the detailed description.

DESCRIPTION OF THE PREFERRED EMBODIMENT

Figure 1:
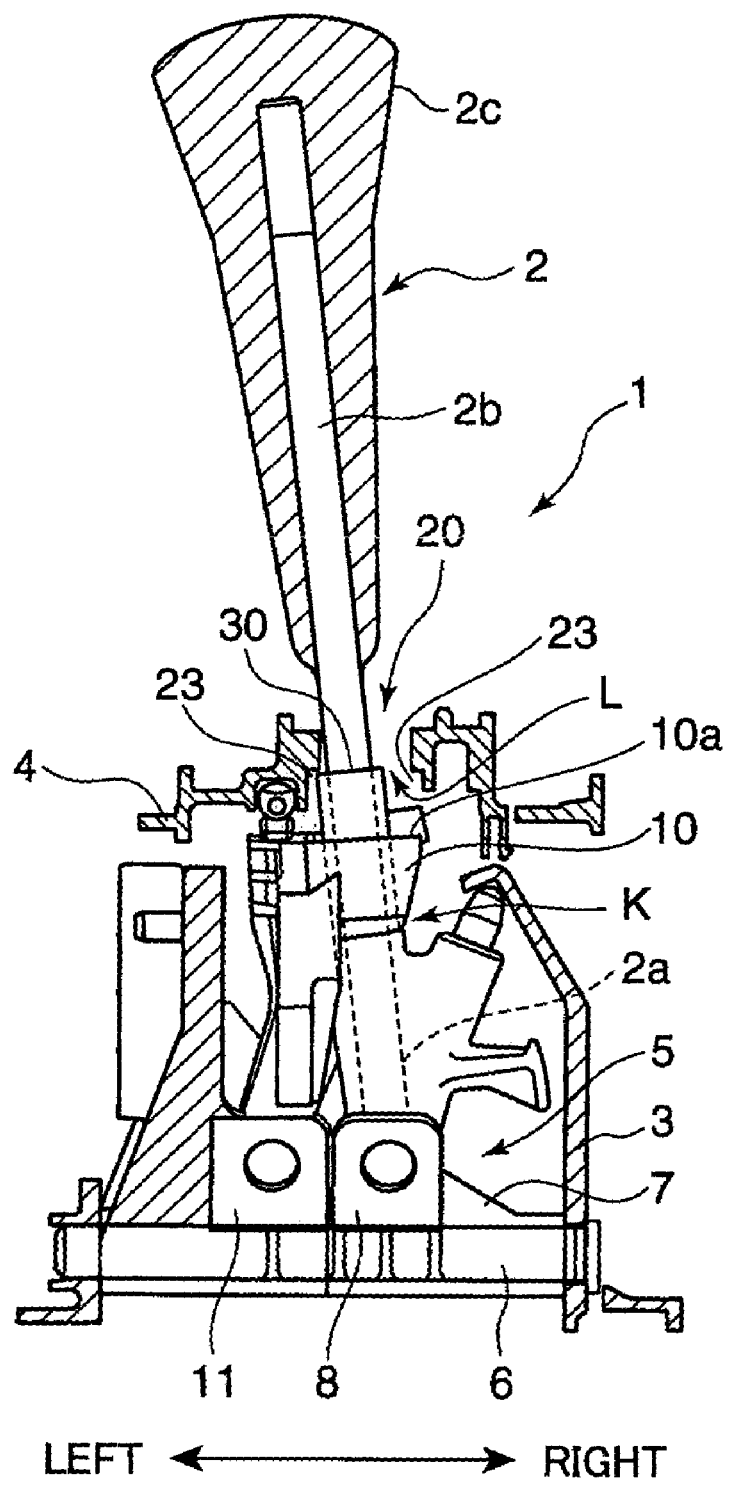
FIG. 1 is a sectional view showing a shifter assembly according to an embodiment of the present invention, wherein a shift lever is in a neutral position.
Figure 2:
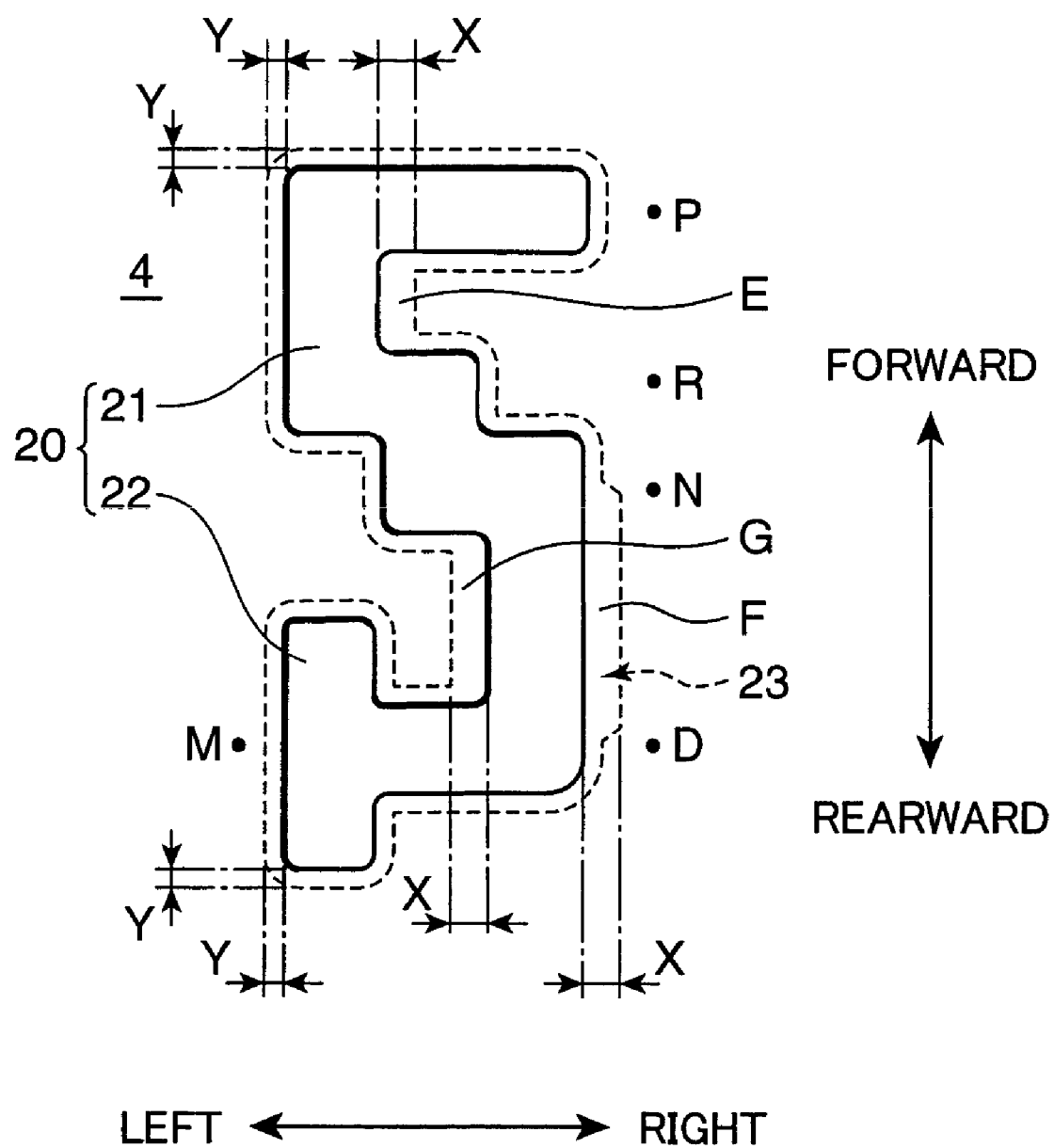
FIG. 2 is a top plan view showing the shift pattern of a guide passage in the shifter assembly of FIG. 1.
Figure 3:
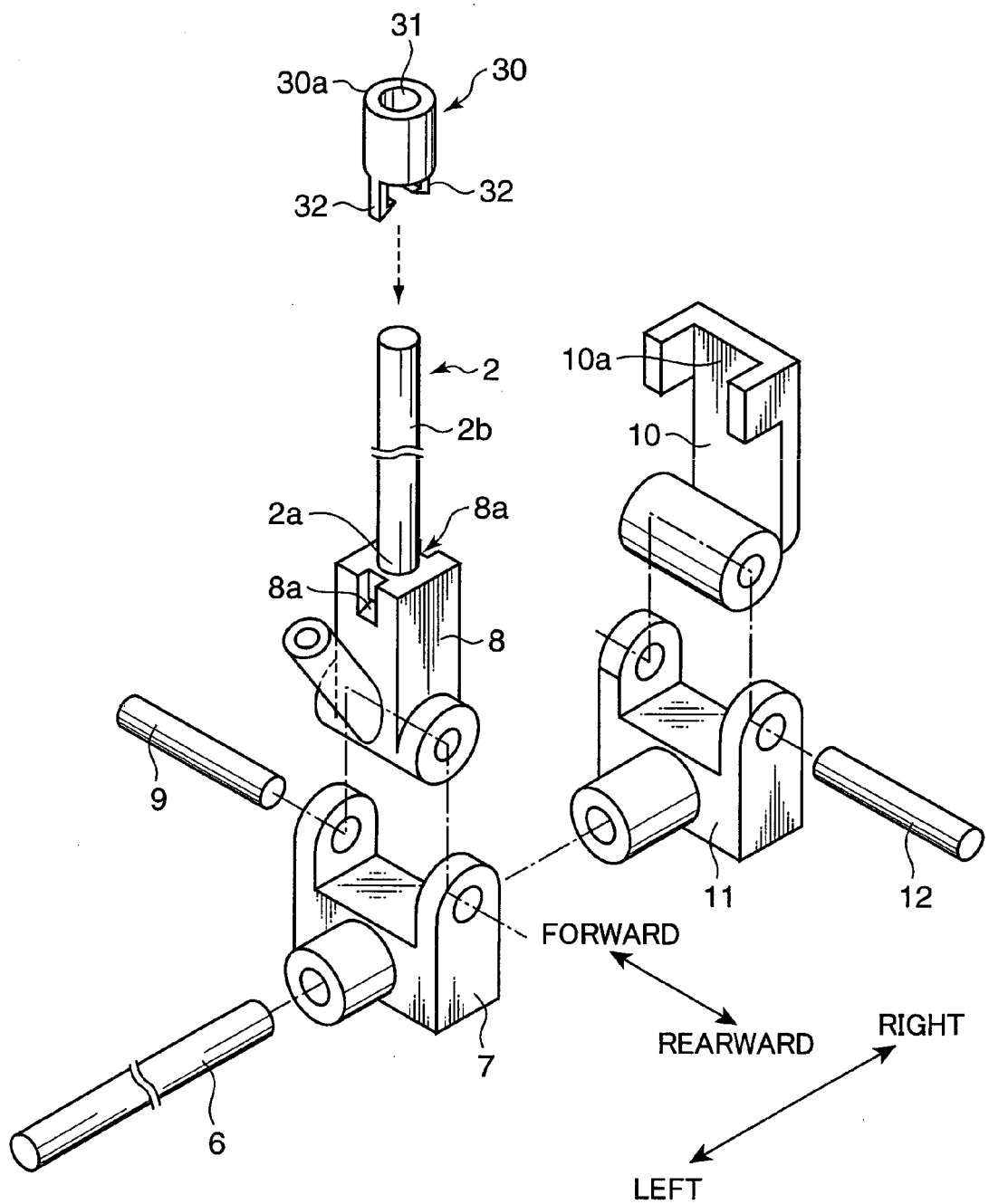
FIG. 3 is an explanatory perspective view of an operation of attaching a noise-reducing member to the shift lever and an operation of attaching a sliding block, in the shifter assembly of FIG. 1.

The present invention will now be specifically described. FIG. 1 is a sectional view showing a shifter assembly according to one embodiment of the present invention, wherein a shift lever is in a neutral position. FIG. 2 is a top plan view showing the shift pattern of a guide passage in the shifter assembly. FIG. 3 is an explanatory perspective view of an operation of attaching a noise-reducing member to the shift lever and an operation of attaching a sliding block.

A shift assembly 1 for an automatic transmission of an automotive vehicle, according to one embodiment of the present invention, comprises a base plate 3 for supporting the lower end 2a of a shift lever 2, and a gate plate 4 attached to the upper portion of the base plate 3.

The shift lever 2 includes a solid or hollow rod-shaped shaft 2b, and a shift knob (not shown) attached to the upper end of the shaft 2a. The base plate 3 is mounted on a floor panel of the vehicle. The base plate 3 includes a support member 5 for supporting the lower end 2a of the shift lever 2 in such manner that the shift lever 2 is swingably moved in the frontward/rearward or longitudinal direction and the rightward/leftward or lateral direction of the vehicle. The support member 5 includes a primary shaft 6 extending in the lateral direction, a first shaft member 7 rotatably supported by the primary shaft 6, and a second shaft member 8 extending in the longitudinal direction. The second shaft member 8 is attached to the upper portion of the first shaft member 7, and the lower end 2a of the shift lever 2 is attached to the second shaft member 8. That is, the first shaft member 7 is adapted to be rotated about the primary shaft 6 in the longitudinal direction so as to allow the shift lever 2 to be swingably moved in the longitudinal direction, and the second shaft member 8 is adapted to be rotated in the lateral direction so as to allow the shift lever 2 to be swingably moved in the lateral direction.

Further, on the right side (left side in FIG. 1) of the first shaft member 7 on the primary shaft 6, a third shaft member 11 is attached to the primary shaft 6 in such manner that it is rotatable about the primary shaft 6 in the longitudinal direction. A sliding block 10 is attached to the upper portion of the third shaft member 11 in such manner that the lower portion of the sliding block 10 is supported to be rotatable relative to the third shaft member 11 in the lateral direction. The sliding block 10 is formed with an engagement recess 10a having an opening on the left side. The sliding block 10 is adapted to be rotated or slidably moved in the longitudinal direction while receiving the shaft 2b of the shift lever 2 in the engagement recess 10a when the shift lever 2 is swingably moved in the longitudinal direction, and to disengage the shaft 2b of the shift lever 2 from the engagement recess 10a when the shift lever 2 is inclined in the leftward direction from an after-mentioned drive position.

The gate plate 4 is formed with a gate passage 20 for guiding the shaft 2b of the shift lever 2. As shown in FIG. 2, the gate passage 20 including an automatic-mode gate passage segment 21 for shifting the transmission in an automatic mode, and a manual-mode gate passage segment 22 for shifting the transmission in a manual mode. The automatic-mode gate passage segment 21 includes a park position P, a reverse position R, a neutral position N and a drive position D to define a curved shift pattern between the respective positions, and the manual-mode gate passage segment 22 includes a shift-up position (+) and a shift-down position (−) which are disposed on the side of the drive position D.

Figure 4B:
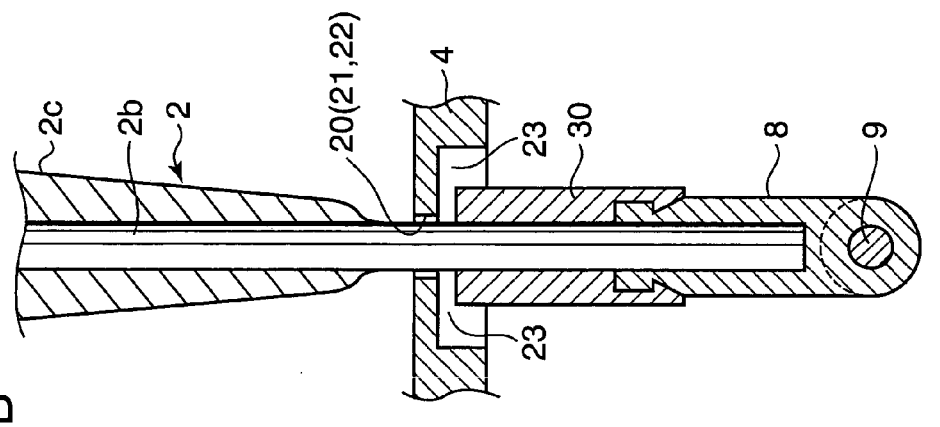
FIGS. 4A and 4B are explanatory views of the physical relationship between the shift lever and the noise-reducing member in the shifter assembly of FIG. 1.
Figure 4A:
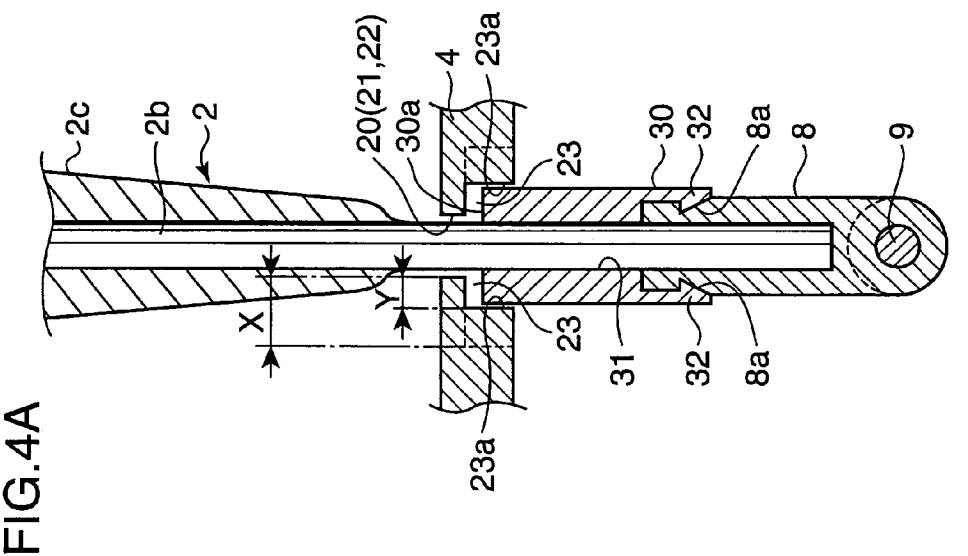
Figure 5A:
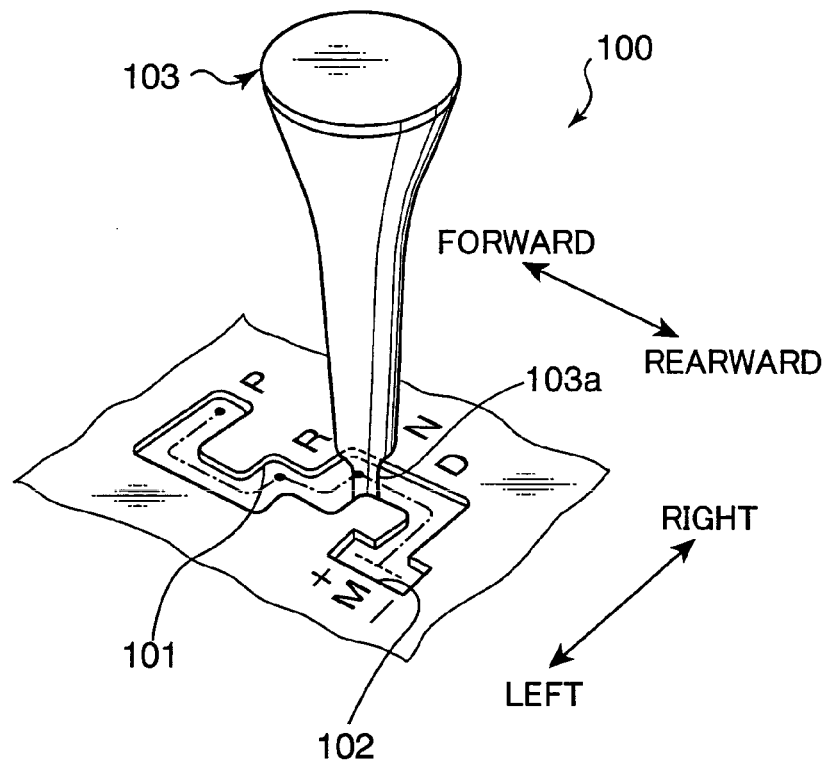
FIG. 5A is a perspective outside view snowing a conventional automatic transmission shifter assembly for automotive vehicles.
Figure 5B:
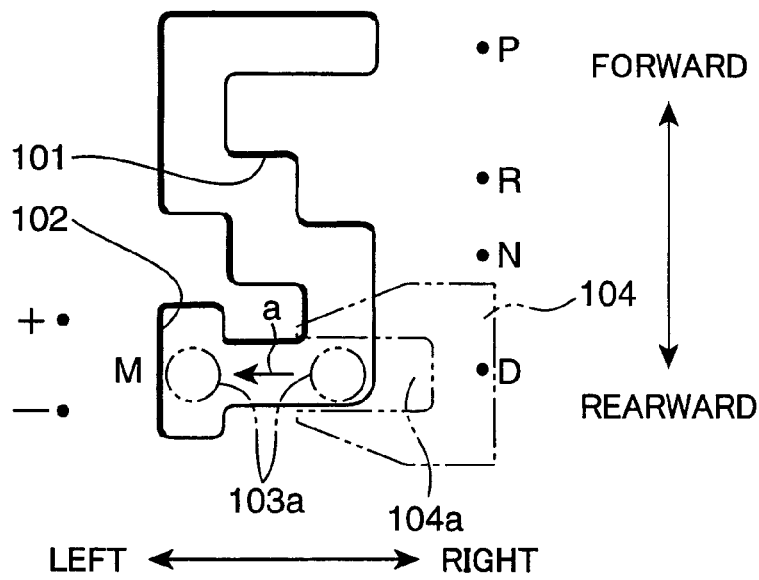
FIG. 5B is a schematic top plan view of a gate passage in the conventional shifter assembly.
Figure 6:
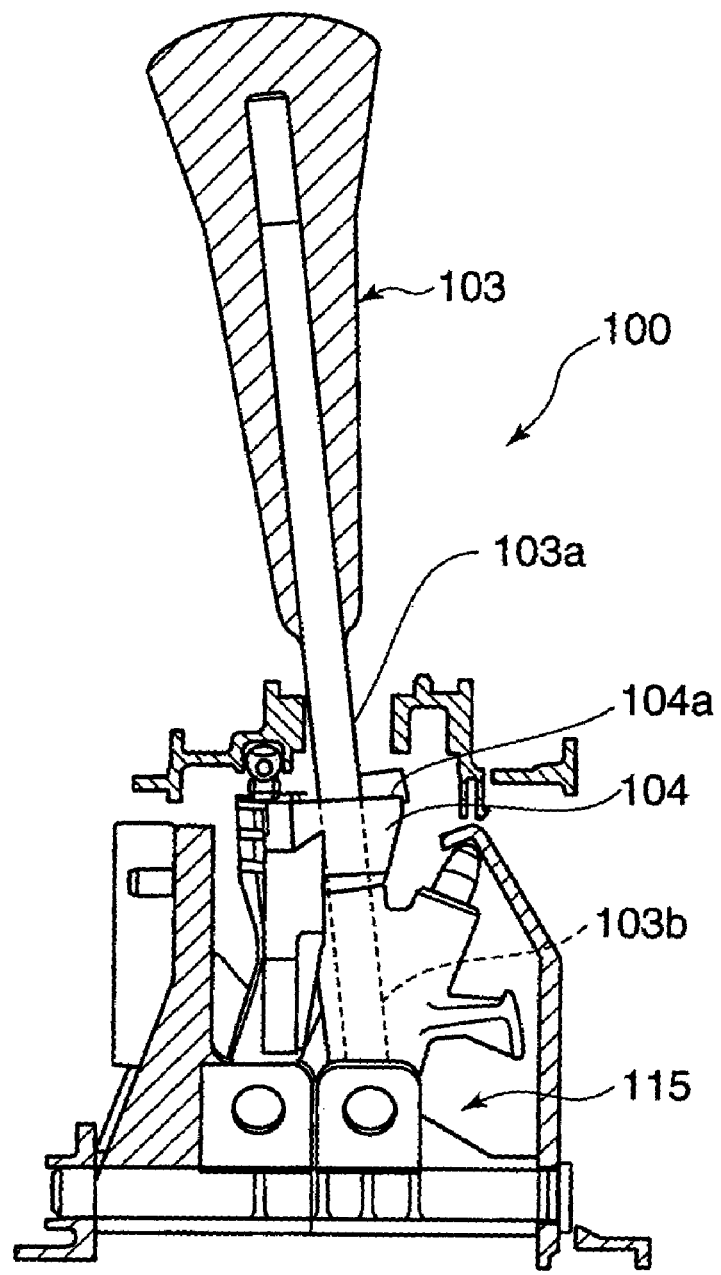
FIG. 6 is a vertical sectional view of the conventional shifter assembly, wherein a shift lever is in a neutral position.

The peripheral end of the gate passage 20, specifically the edges 20A, 20B of the gate plate 4 defining the gate passage 20 therebetween, in the underside of the gate plate 4, is reduced in thickness at a given distance from the peripheral end to form a stepped gap 23 along the entire peripheral end (see FIGS. 4A). As shown by the broken line in FIG. 2, the width of the stepped gap is set at a value Y except for the region E on the right side of a longitudinally linear gate passage segment between the park position P and the reverse position R, and the regions F and G on both sides of a longitudinally linear gate passage segment between the neutral position N and the drive position D. Each of the widths of the regions E, F and G in the longitudinally linear gate passage segments is set at a value X greater than the value Y.

As shown in FIG. 1, a noise-reducing member 30 is attached onto the shaft 2a of the shift lever 2 to extend upwardly from a region K allowing the noise-reducing member 30 to be engaged with the engagement recess 10a to a region L allowing the noise-reducing member 30 to be brought into contact with the stepped gap 23. The noise-reducing member 30 is made of a flexible material, such as thermoplastic elastomer including polyester elastomer. The noise-reducing member 30 has a through-hole 31 for allowing the shaft 2b of the shift lever 2 to be penetratingly inserted there into, and a pawl 32 as an attachment element to be engaged with a receiving recess 8a as a receiving element provided in the second shaft member 8 for supporting the shift lever 2, as shown in FIGS. 3, 4A and 4B. The upper end 30a of the noise-reducing member 30 is adapted to be guided along the stepped gap 23.

The above noise-reducing member 30 can be attached to the shift lever 2 through a simple operation of inserting the shift lever 2 penetratingly into the through-hole 31 and engaging the pawl 32 with the receiving recess 8a. Thus, the noise-reducing member 30 can be assembled into the shift lever 2 with enhanced operating efficiency, and reliably prevented from disengaging from the shift lever 2. In addition, the upper portion of the gate passage 20 located above the stepped gap 23 has a smaller width than that of the lower guide passage defined by the stepped gap 23 to guide the upper end 30a of the noise-reducing member 30. Thus, the noise-reducing member 30 received in the stepped gap 23 can be effectively hidden from view through the upper portion of the gate passage 20 to provide enhanced appearance.

The relationship between the noise-reducing member 30 attached to the shift lever in the above way and the widths X and Y of the stepped gap 23 is arranged such that, in the segments of the gate passage 30 other than the regions E, F, G in the linear gate passage segments, the upper end 30a of the noise-reducing member 30 comes into contact with the sidewall 23a of the stepped gap 23 as shown in FIG. 4A, but in the regions E, F, G in the longitudinally linear gate passage segments, the noise-reducing member 30 does not come into contact with the stepped gap 23 as shown in FIG. 4B. This width relationship, i.e., A and Y, of the stepped gap 23 is adapted because: 1) the likelihood of the shift lever 2 hitting the gate plate 4 is higher when the shift lever 2 is moved in the lateral direction and such hitting should be accordingly prevented by making the upper end 30a of the noise-reducing member 30 contact with the stepped gap 23; the likelihood of the shift lever 2 hitting the gate plate 4 is lower when the shift lever 2 is moved in the longitudinal direction and it is accordingly desirable to assure the smooth movement of the shift lever 2 without any resistance between the noise-reducing member 30 and the stepped gap 23.

In the above shifter assembly according to this embodiment of the present invention, the flexible noise-reducing member 30 is attached to the shift lever 2 in its region allowing the noise-reducing member 30 to be brought into contact with the gate passage 20. Thus, hitting noises to be generated between the gate passage 20 and the shift lever 2 can be advantageously suppressed. In addition, the flexible noise-reducing member 30 is provided to extend from the region L allowing the noise-reduction member 30 to be brought into contact with the gate passage 20 to the region K allowing the noise-reduction member 30 to be engaged with the engagement recess 10a. Thus, both hitting noises between the gate passage 20 and the shift lever 2 and between the shift lever 2 and the sliding block 10 can be suppressed only by one piece of the noise-reducing member 30. Further, as compared to a case where two noise-reducing members are provided separately in the regions of the shift lever corresponding to the gate passage and the sliding block, the shifter assembly can be reduced in cost while facilitating an operation of attaching the noise-reducing member to the shift lever.

An advantageous embodiment of the present invention has been shown and described. It is obvious to those skilled in the art that various changes and modifications may be made therein without departing from the spirit and scope thereof as set forth in appended claims.

For example, while the stepped gap in the above embodiment has been set to have a larger width in the region on the right side of the longitudinally linear gate passage segment between the park position P and the reverse position R, and the regions on both sides of the longitudinally linear gate passage segment between the neutral position N and the drive position D, than that of the remaining stepped gap, the present invention is not limited thereto. Specifically, instead of or in addition to the above regions in the linear gate passage segments, the region on the left side of the longitudinal linear gate passage segment between the park position P and the reverse position R, and the regions on both sides of the manual-mode linear gate passage segment may be subjected thereto.

Further, while the shifter assembly in the above embodiment has been configured such that the pawl (32) serving as an attachment element is formed in the noise-reducing member, and the receiving recess (8a) serving as a receiving element is formed in the second shaft member, the present invention is not limited thereto, but it may be an inverse arrangement where the receiving recess serving as the attachment element is formed in the noise-reducing member, and the pawl serving as the receiving element is formed in the second shaft member.

Furthermore, while the shifter assembly in the above embodiment has been configured such that the attachment element of the noise-reducing member is engaged with the receiving element formed in the secondary shaft member for supporting the shift lever, and, the present invention is not limited thereto, but it may be configured such that the receiving element is provided directly in the shaft of the shift lever attached to the second shaft member, and the attachment element of the noise-reducing member is engaged with this receiving element.

While the number of pairs of the attachment and receiving elements has not been specifically described in the above embodiment, it is understood that two or more of pairs of the attachment and receiving elements may be appropriately selected.

As described above, an inventive shifter assembly for an automatic transmission of an automotive vehicle includes a shift lever, and a gate plate formed with a gate passage. The shift lever is adapted to be manipulated along the gate passage and moved in the longitudinal and lateral directions of the vehicle in response to the shift lever manipulation. The shifter assembly comprises a noise-reducing member attached onto the shift lever in its region allowing the noise-reduction member to be brought into contact with the gate passage.

The noise-reducing member is attached onto the shift lever in its region allowing the noise-reduction member to be brought into contact with the gate passage. Thus, hitting noises to be generated between the gate passage and the shift lever can be advantageously suppressed.

In the case where the shifter assembly includes a sliding block having an engagement recess adapted to be engaged with the shift lever, the noise-reducing member may be provided to extend from a region of the shift lever allowing the noise-reduction member to be engaged with the engagement recess to the above region allowing the noise-reduction member to be brought into contact with the gate passage.

According to this structure, both hitting noises between the gate passage and the shift lever and between the shift lever and the sliding block can be suppressed only by one piece of the noise-reducing member. Thus, as compared to a case where two noise-reducing members are provided separately in the regions of the shift lever corresponding to the gate passage and the sliding block, the shifter assembly can be reduced in cost while facilitating an operation of attaching the noise-reducing member to the shift lever.

In the shifter assembly, the noise-reducing member may be formed with a through-hole into which the shift lever is penetratingly inserted, and an attachment element which is engaged with a receiving element provided in the shift lever.

According to this structure, the noise-reducing member can be fixedly attached to the shift lever through a simple operation of inserting the shift lever penetratingly into the through-hole and engaging the attachment element of the noise-reducing member with the receiving element of the shift lever. Thus, the noise-reducing member can be assembled into the shift lever with enhanced operating efficiency, and reliably prevented from disengaging from the shift lever.

In the shifter assembly, the peripheral end of the gate passage in the underside of the gate plate is formed to have a width greater than that of the upper portion of the gate passage so as to form a stepped gap for receiving the upper end of the noise-reducing member.

According to this structure, the upper portion of the gate passage has a smaller width than that of the lower portion of the guide passage defined by the stepped gap. Thus, the noise-reducing member received in the stepped gap can be effectively hidden from view through the upper portion of the gate passage to provide enhanced appearance.

Further, when the gate passage has a linear gate passage segment extending in the longitudinal direction, at least a part of the stepped gap in the linear gate passage segment may have a width greater than that of the remaining stepped gap to allow the shift lever to freely move in the upper portion of the gate passage.

According to this structure, in the linear gate passage segment extending in the longitudinal direction, the noise-reducing member does not come into contact with the stepped gap. Thus, the sliding friction due to the noise-reducing member can be eliminated in the particular longitudinal portion. In this case, even if the shift lever is brought directly into contact with the upper portion of the gate passage, the noise reduction effect will not be practically deteriorated because no or extremely low hitting noise is generated in the longitudinally linear gate passage segment.

The noise-reducing member may be preferably made of a flexible material. The flexible noise-reducing member can serve as a cushion, advantageously reducing the hitting impact of the shift lever against the gate plate.

This application is based upon and claims the benefit of priority from the prior Japanese Patent Application No. 2002-194639, filed on Jul. 3, 2002, the entire contents of which are incorporated herein by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A shifter assembly for an automatic transmission of an automotive vehicle, comprising:

a gate plate with opposite upper and lower surfaces and a gate passage extending through the gate plate from the upper surface to the lower surface, a stepped gap formed on the lower surface adjacent the gate passage, the stepped gap being defined by a sidewall surface extending angularly up from the lower surface of the gate plate towards the upper surface thereof and a downwardly facing surface intersecting the sidewall surface and extending angularly from the sidewall surface to the gate passage, the stepped gap defining width dimensions extending away from the gate passage, at least a first portion of the stepped gap defining a first width and at least a second portion of the stepped gap defining a second width that exceeds the first width;

a shift lever passing through and movable in the gate passage; and a noise-reducing member fixedly attached on a part of the shift lever that corresponds to the stepped gap, wherein in the first portion of the stepped gap, a space between the noise-reducing member and the sidewall surface of the stepped gap is narrower than a space between the shift lever and the gate passage so that the noise-reducing member prevents contact of the shift lever with the gate plate, and wherein in the second portion of the stepped gap, a space between the noise-reducing member and the sidewall surface of the stepped gap is wider than a space between the shift lever and the gate passage to allow the shift lever to move without contact between the noise-reducing member and the sidewall surface of the stepped gap.

2. The shift assembly as defined in claim 1, wherein the noise-reducing member is made of a flexible material.

3. The shifter assembly as defined in claim 1, further comprising a sliding block formed with an engagement recess, wherein the noise-reducing member is engageable with the engagement recess of the sliding block.

4. The shifter assembly as defined in claim 3, wherein the stepped gap is adapted for receiving an upper end of the noise-reducing member.

5. The shifter assembly as defined in claim 3, wherein the noise-reducing member is formed with a through-hole for passing the shift lever, and an attachment element attachable with the shift lever.

6. The shifter assembly as defined in claim 3, wherein the gate passage has a longitudinally extending section extending in a first direction parallel to the upper surface of the gate plate and a laterally extending section extending parallel to the upper surface of the gate plate and angularly aligned to the longitudinally extending section, wherein the second section of the stepped gap is in the longitudinally extending section and wherein the first section of the stepped gap is in the laterally extending section to allow the shift lever to move without contact between the noise-reducing member and the gate plate.

7. The shifter assembly as defined in claim 1, wherein the stepped gap defines the first width on both sides of the gate passage along a first selected section of the gate passage.

8. The shifter assembly as defined in claim 7, wherein the stepped gap defines the second width on both sides of the gate passage along a second selected section of the gate passage.

9. The shifter assembly as defined in claim 8, wherein the stepped gap defines the first width on one side of the gate passage and the second width on an opposite side of the gate passage along a third selected section of the gate passage.

10. The shifter lever assembly as defined in claim 1, wherein the sidewall facing surface of the stepped gap is aligned substantially normal to the lower surface of the gate plate.

11. The shifter lever assembly as defined in claim 10, wherein the downwardly facing surface of the stepped gap is aligned substantially parallel to the lower surface of the gate plate.

12. A shifter assembly for an automatic transmission of an automotive vehicle, comprising:

a gate plate with opposite upper and lower surfaces and a gate passage extending through the gate plate from the upper surface to the lower surface, a stepped gap formed on the lower surface adjacent the gate passage, the stepped gap being defined by a sidewall surface extending angularly up from the lower surface of the gate plate towards the upper surface thereof and a downwardly facing surface intersecting the sidewall surface and extending angularly from the sidewall surface to the gate passage, the stepped gap defining width dimensions measured parallel to the upper surface and extending away from the gate passage, at least a first portion of the stepped gap defining a first width and at least a second portion of the stepped gap defining a second width that exceeds the first width;

a shift lever passing through and movable in the gate passage; and a noise-reducing member fixedly attached on a part of the shift lever that corresponds to the stepped gap, the noise-reducing member extending from the shift lever a distance greater than the first width but less than the second width whereby the noise-reducing member prevents contact of the shift lever with the gate plate in portions where the stepped gap has the first width.

13. The shift assembly as defined in claim 12, wherein the noise-reducing member is made of a flexible material.

14. The shifter assembly as defined in claim 12, wherein the stepped gap defines the first width on both sides of the gate passage along a first selected section of the gate passage.

15. The shifter assembly as defined in claim 14, wherein the stepped gap defines the second width on both sides of the gate passage along a second selected section of the gate passage.

16. The shifter assembly as defined in claim 12, wherein the stepped gap defines the first width on one side of the gate passage and the second width on an opposite side of the gate passage along a third selected section of the gate passage.

17. The shifter assembly as defined in claim 12, wherein the sidewall surface of the stepped gap is aligned substantially normal to the lower surface of the gate plate.

18. The shifter assembly as defined in claim 17, wherein the downwardly facing surface of the stepped gap is aligned substantially parallel to the lower surface of the gate plate.

* * * * *